United States Patent [19]

Baker et al.

[11] Patent Number: 5,030,015
[45] Date of Patent: Jul. 9, 1991

[54] FLUID BEARINGS

[75] Inventors: Alan D. Baker, Radlett; Peter M. Leslie, Welwyn Garden City, both of England

[73] Assignee: Rolls-Royce plc, London, England

[21] Appl. No.: 320,856

[22] Filed: Mar. 8, 1989

Related U.S. Application Data

[63] Continuation of Ser. No. 118,013, Nov. 9, 1987, abandoned.

[30] Foreign Application Priority Data

Nov. 19, 1986 [GB] United Kingdom ............... 8627641

[51] Int. Cl.[5] .......................................... F16C 17/03
[52] U.S. Cl. ............................................. 384/117
[58] Field of Search ............... 384/117, 119, 118, 111, 384/116

[56] References Cited

U.S. PATENT DOCUMENTS 4,469,453 9/1984 Kozawa et al. ..................... 384/117
4,490,054 12/1984 Kimmelaar ........................... 384/117
4,600,317 7/1986 Mori ..................................... 384/119
4,743,125 5/1988 Dammel et al. ..................... 384/119

FOREIGN PATENT DOCUMENTS 1562511 3/1980 United Kingdom .

Primary Examiner—Lenard A. Footland
Attorney, Agent, or Firm—Oliff & Berridge

[57] ABSTRACT

A fluid bearing assembly for a shaft comprising a plurality of rigid shells circumferentially spaced around the shaft. Each shell is provided with a profiled portion adjacent said shaft which in operation acts to provide an air cushion upon which the shaft rotates and a profiled end portion which prevents the shells moving radially inward beyond a predetermined point whilst allowing said shells to move radially outwardly.

13 Claims, 7 Drawing Sheets

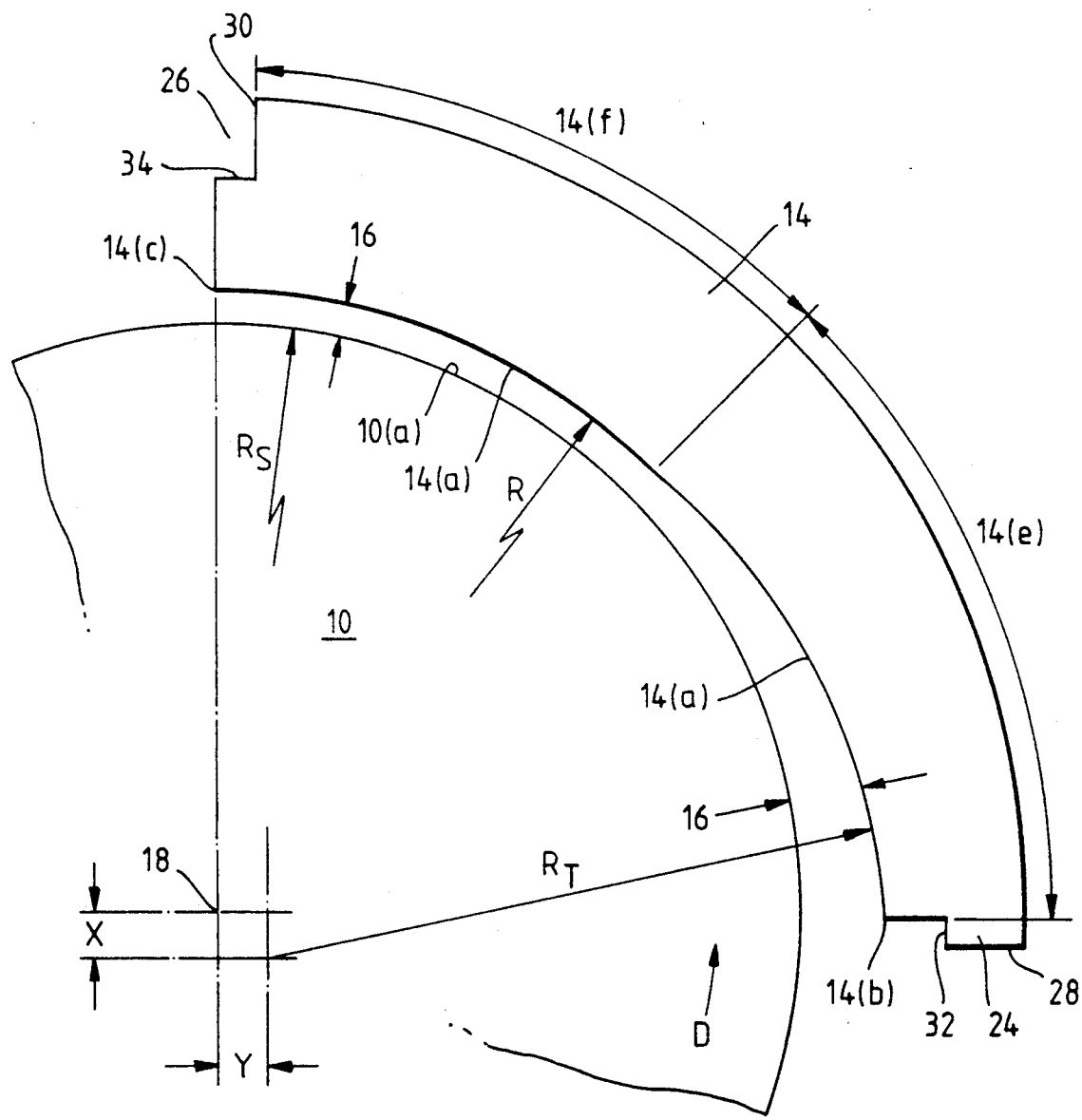

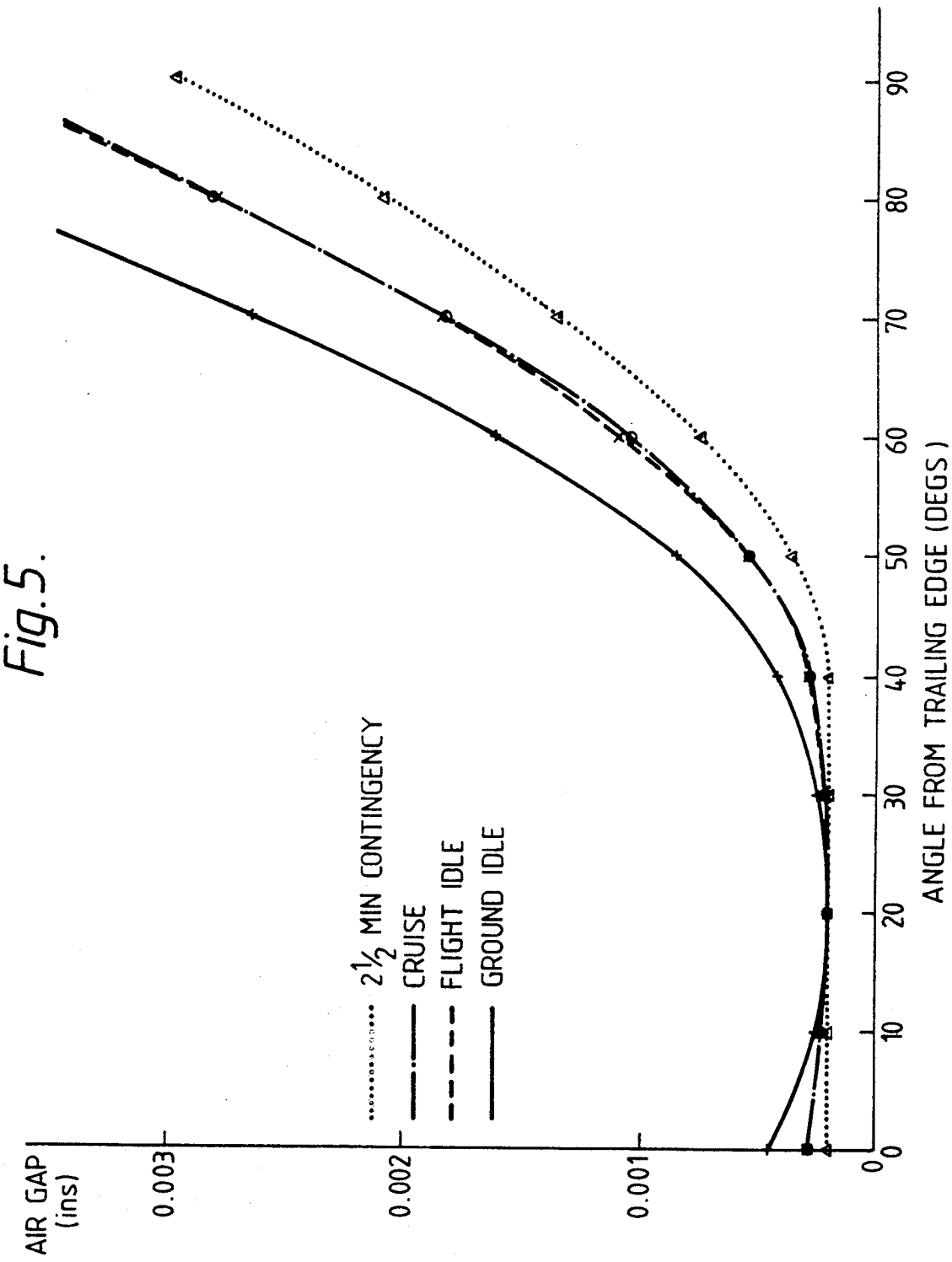

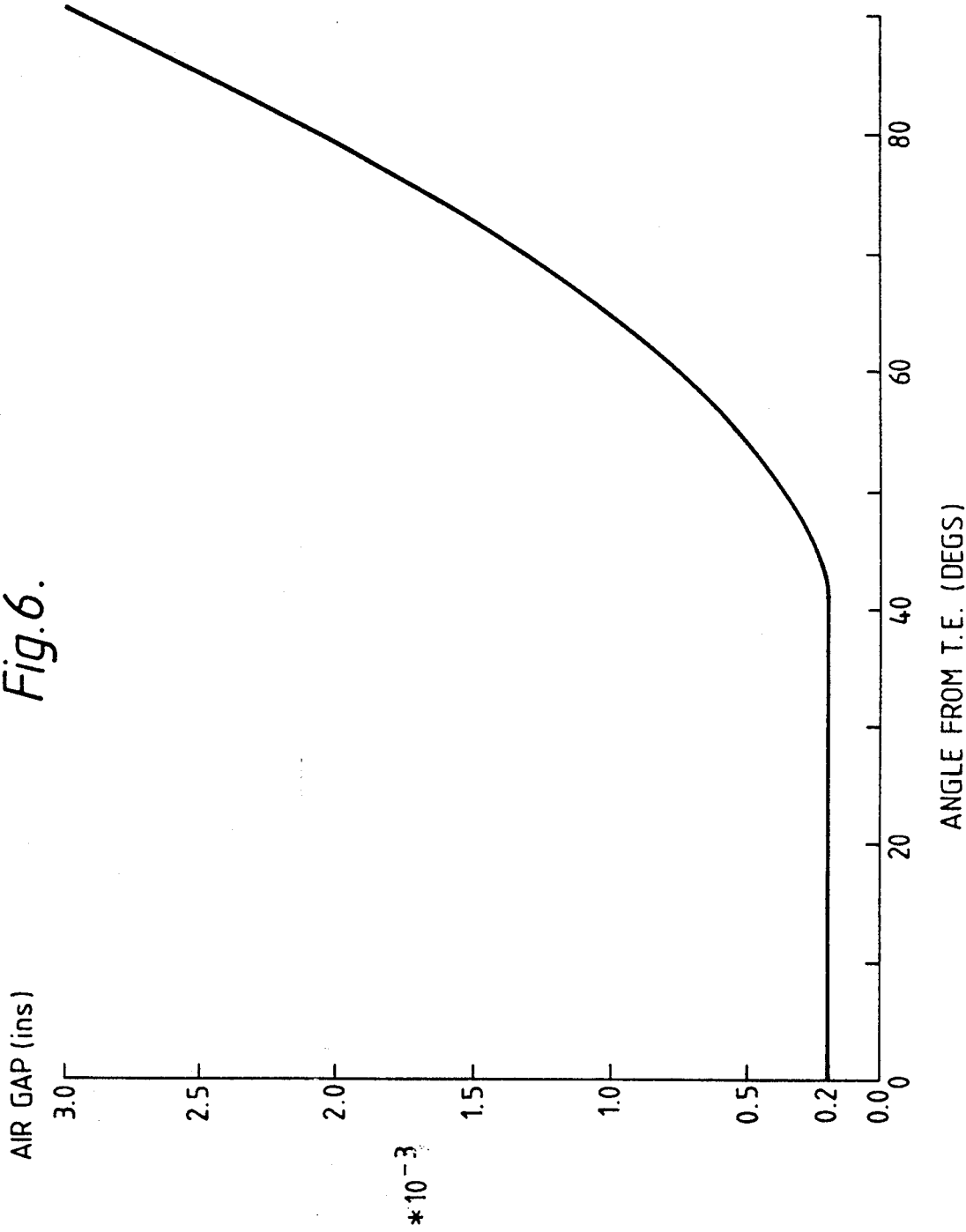

FLUID BEARINGS

This is a Continuation of application Ser. No. 07/118,013 filed Nov. 9, 1987 now abandoned.

The invention relates to fluid bearings and is particularly relevant to the provision and maintenance of a fluid gap between the bearing and the rotating component which is supported therein.

The provision and maintenance of an arcuate and consistent fluid gap between the bearing and the rotating component is critical to the load carrying capacity and long life of the bearing.

One fluid bearing which attempts to comply with the above mentioned requirements, described in UK Patent Number 1562511, comprises a fluid bearing assembly including a pair of elements mounted for movement relative to each other on a fluid film, said film being formed as a consequence of the relative movement between a bearing surface on one of the elements and bearing surfaces on a plurality of resilient shells which are supported at points along their lengths between said elements, wherein;

each of the resilient shells is of a thickness which, relative to its other dimension, is such as to prevent the shell from locally deflecting at unsupported positions in response to increases in the pressure of said fluid film, and load reacting members are mounted between each of the shells and the element on which the shells are mounted, each load reacting member providing in response to increases in pressure in the fluid film, reaction loads at two locations on a shell on opposite sides of the resultant of the pressure in said fluid film to bend each of the shells in the manner of a stiff beam to modify the shapes of the shells so that the bearing surfaces on the shells conform more closely to the bearing surface on said one of the elements in the regions of minimum fluid film thickness.

The above described bearing is provided for use with a rotatable shaft to form a fluid bearing assembly in which the bearing is preferably effected by positioning the load reacting members between the shells and the housing in such a manner that a preselected portion of the fluid pressure load is reacted adjacent the trailing edge of each shell and the remainder of the radial load is reacted at an intermediate position between the ends of each shell. These reactions between the shells and the load reacting members in conjunction with the fluid pressure load cause a bending deformation to be imparted to the shells which modifies the shape of the shells so that they conform more closely with the shape of the surface of the supported element (shaft) in the region of the minimum gap thickness and create a more uniform gap thickness over a greater length of the shell.

The shells of the above mentioned bearing are, however, only capable of approximating to the required shape in the region of the minimum gap as shown in FIG. 4, and as a consequence the load carrying capacity is severely compromised.

The above mentioned bearing is also complex in design and suffers from fretting which takes place at the shell/spring and shell/shell interface.

It is an object of the present invention to provide a fluid bearing which reduces and possibly eliminates the above mentioned disadvantages.

The present invention will now be described by way of example only with reference to the accompanying drawings, in which:

FIG. 3 is an exploded view of one shell of the bearing shown in FIG. 2.

FIG. 5 is a graph of fluid gap profiles for a profiled shell gas bearing.

FIG. 6 is a graph of fluid gap profile for a profiled shell bearing operating at its optimised condition.

Figure 4:
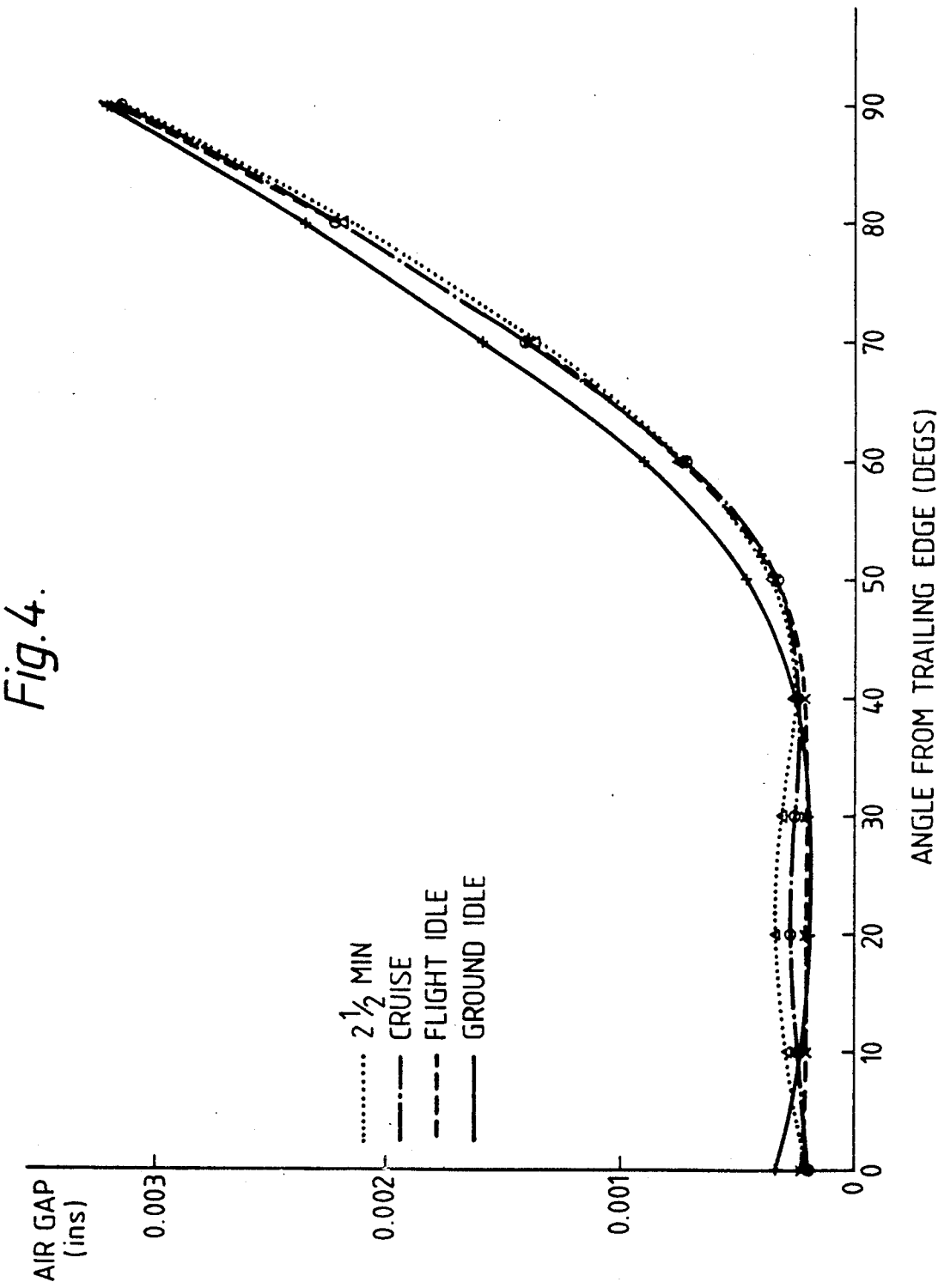
FIG. 4 is a graph of fluid gap profiles for a conformable shell fluid bearing.
Figure 1:
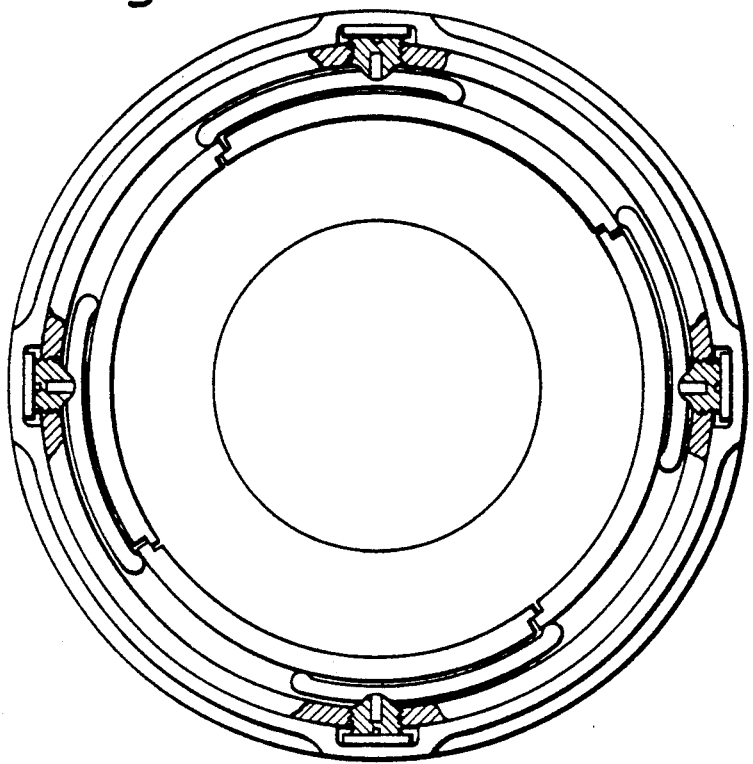
FIG. 1 illustrates a fluid bearing as described in UK Patent No. 1562511 and commonly known as a conformable shell bearing.
Figure 2:
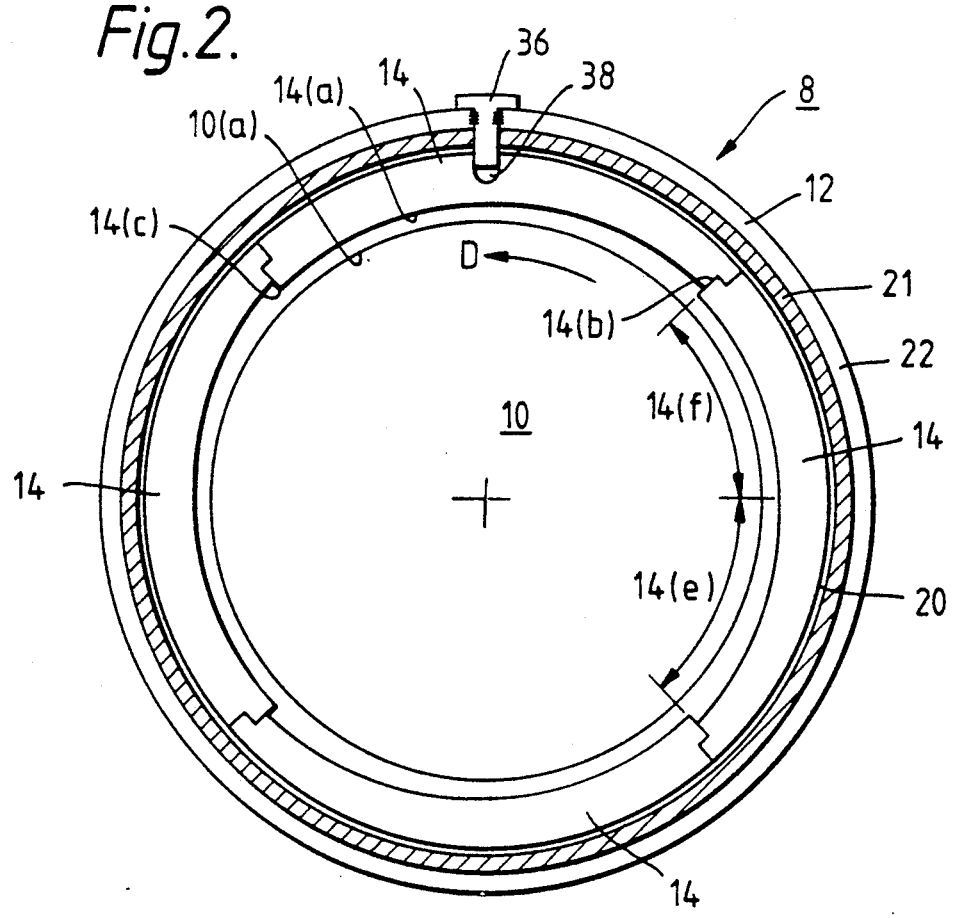
FIG. 2 illustrates a profiled shell gas bearing which is the subject of this invention.
Figure 7:
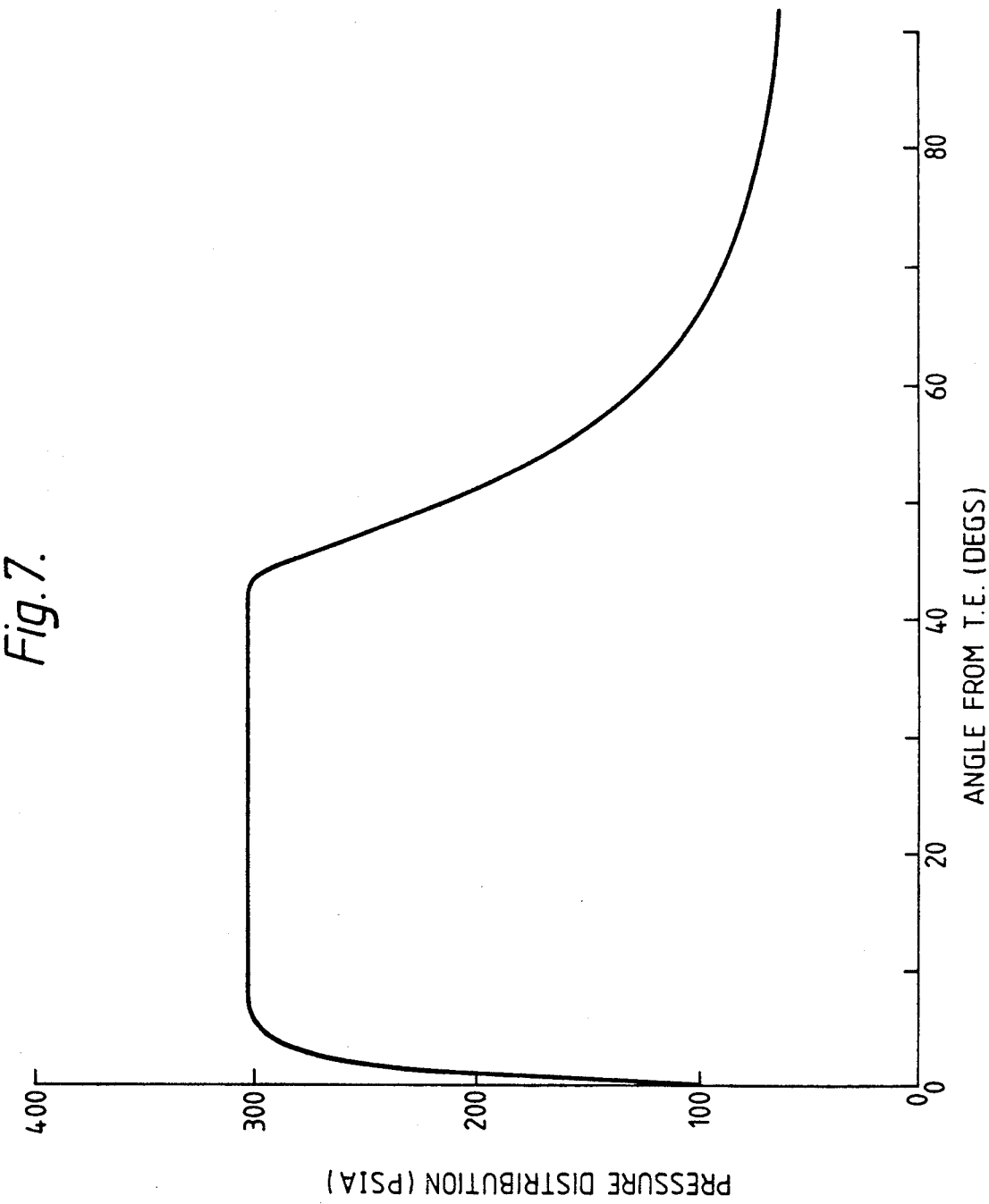
FIG. 7 is a graph of pressure distribution for the profiled shell bearing at its optimised condition.

Referring now to the drawings, in FIG. 2 there is shown a diagramatic view of a fluid bearing assembly 8 in which a shaft 10 is supported for rotation in a housing 12 by means of a fluid film formed in operation between the surface of the shaft 10(a) and the surface 14(a) of one or more rigid shells 14. Each shell 14 is provided with a leading edge 14(b) and a trailing edge 14(c). Preferably, the shell 14 is split into two portions, a first portion 14(e) situated towards the upstream edge which is provided with a tapered profile which allows the gap 16 to be gradually reduced towards a second portion 14(f) situated towards the downstream end which is shaped to maintain a substantially constant gap 16. It will be appreciated from FIG. 3 that the tapered portion may be formed by grinding a circular profile having a radius R originating from a point displaced circumferentially forward and radially outward from the shaft centerline 18 by an amount shown as x and y respectively. The profile of the second portion 14(f) may be produced by grinding a circular profile having a radius R originating from the shaft centerline 18. Each shell 14 is provided with an extended portion 24 at its leading edge 14(b) and a cut out 26 at its trailing edge 14(c). Both the extended portion 24 and the cut out 26 are provided with radially extending edges 28, 30 and circumferentially extending edges 32, 34.

The shells 14 are assembled such that the radial edge 28 and circumferential edge 32 at the leading edge 14(b) communicate with the radial edge 30 and circumferential edge 34 at the trailing edge 14(c) of the next adjacent shell 14. It will be appreciated from FIG. 3 that the extended portion 24 and the cut out 26 may be sized such that upon assembly the edges 28 and 30 act upon each other to prevent the shells 14 moving radially inwards beyond a predetermined point. It will also be appreciated that the shells 14 are free to move radially outwardly, to a limited extent, by sliding over each other in the region of the circumferentially extending edges 32, 34. The radially outward movement is limited by the constraining action of a resilient band 20 formed around the radially outermost edge of said shells 14. The shells 14 are located in the housing 22 by a further resilient means shown in the form of a brush seal 21 in FIG. 2. The brush seal 21 allows the shells to float to a limited extent, such that they accommodate any movement of the shaft 10 whilst still acting to support it.

In operation, with the shaft rotating in the direction of arrow D, fluid is drawn into the tapered gap 16 and as the speed of rotation increases, the pressure of the fluid film increases until it lifts the shells away of the shaft 10, against the action of the resilient retaining means 20 and the shaft 10 runs wholly supported on the fluid film.

It will be appreciated that because of the effects of centrifugal force and temperature on both the shaft 10 and the comparatively rigid shell 14 a constant gap profile between the two may only be obtained for one of the operating conditions. The condition chosen may, however, be the one under which the bearing 8 most often operates or the one in which the bearing capacity is the most critical.

In FIG. 5, the air gap is shown for the four main operating conditions of a shell which is optimised for operation at the 2.5 minute contingency speed. It will be seen that the gap (best shown in FIG. 6) remains constant over the length of the second portion of the shell 14 at the optimised condition and that the gap tends to enlarge at either end of the second portion 14(f) as the speed of rotation of the shaft 10 reduces to the ground idle speed.

Figure 8:
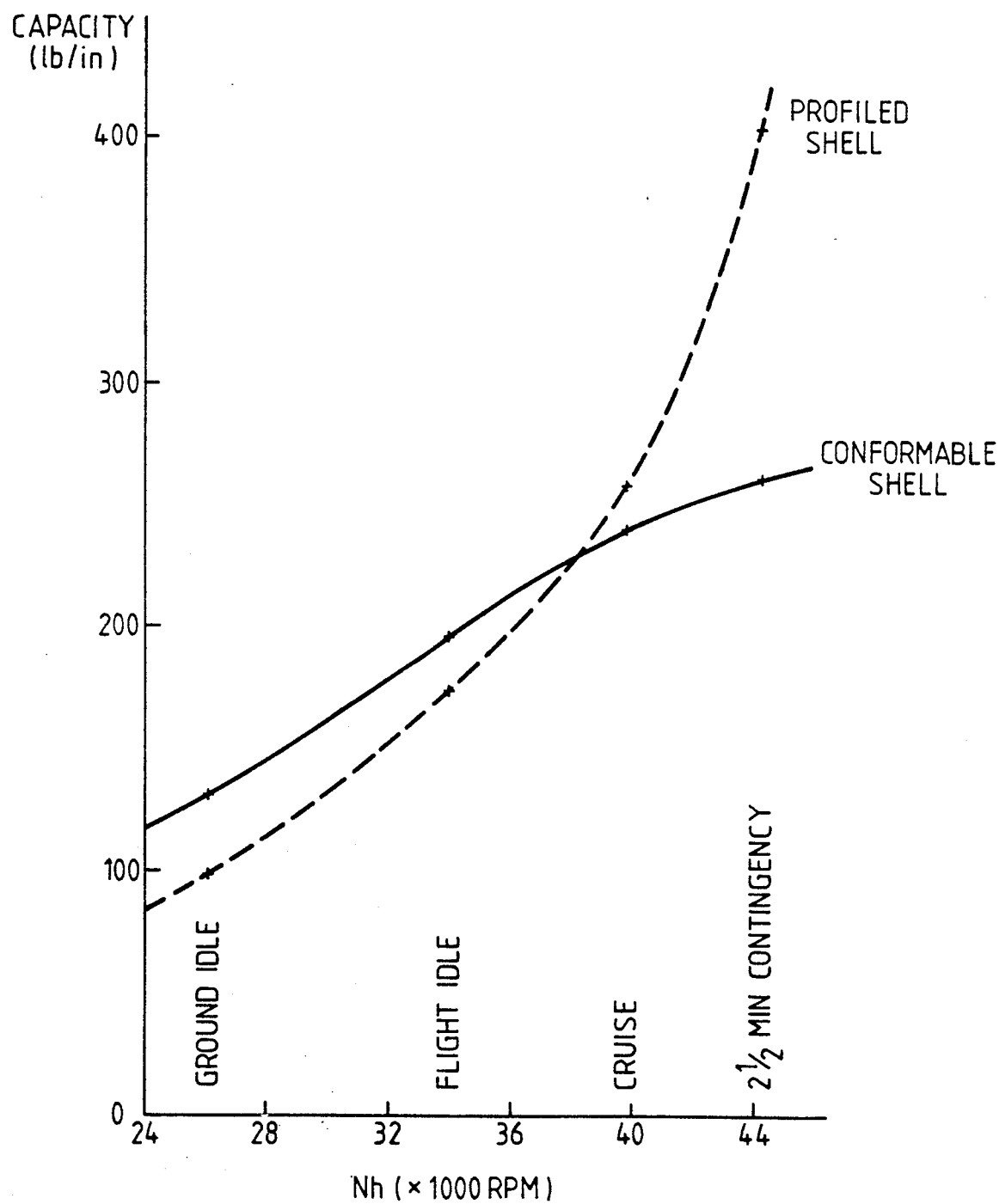
FIG. 8 is a comparative graph of bearing capacities.

Referring now to FIG. 8, which illustrates the bearing capacity across a range of operating speeds, it will be seen that the profiled shell fluid bearing 8 optimised for the 2.5 min contingency operating condition provides a considerably larger load carrying capacity for the more initial speeds of rotation above 38,000 rpm when compared to a conformable shell. It will also be seen that the conformable shell has a slightly better load carrying capacity at the less critical speeds ie below 38,000 rpm.

We claim:

1. A fluid bearing assembly including a pair of elements mounted for movement relative to each other on a fluid film, the first of said elements being provided with a plurality of rigid shells having an upstream edge, a downstream edge and a bearing surface adjacent the second element, in which each shell is divided into two portions the first of which is situated towards the upstream edge and the second of which is situated towards the downstream edge and in which the bearing surface is profiled, in the region of the first portion such that a gap defined between itself and the second element reduces in magnitude towards the downstream edge of the shell, and in the region of the second portion such that the gap formed between itself and the second element remains substantially constant, each shell being provided with a profiled portion at its leading edge and its trailing edge, each leading edge portion communicating with the trailing edge portion of the next adjacent shell to prevent the shells moving radially inwards beyond a predetermined point whilst allowing said shells to move radially outwardly, the radially outward movement of the shells being limited by the action of a resilient rataining means.

2. A fluid bearing assembly according to claim 1 in which, the second element is a shaft having a circular cross sectional form and the shells are circumferentially spaced around the shaft.

3. A fluid bearing assembly according to claim 1 in which each leading edge portion comprises an extended portion having a radially extending edge and a circumferentially extending edge and each trailing edge portion comprises a cut out having a radially extending edge and a circumferentially extending edge.

4. A fluid bearing assembly according to claim 3 in which radially outward movement of the shells is accommodated by allowing each shell to slide over the next adjacent shell in the region of the circumferentially extending edges.

5. A fluid bearing assembly according to claim 3 in which the radially extending edges at the leading edge portion and trailing edge portion communicate with each other to prevent the shells moving radially inward beyond the predetermined point.

6. A fluid bearing assembly including a pair of elements mounted for movement relative to each other on a fluid film, the first of said elements being provided with a plurality of rigid shells having an upstream edge, a downstream edge and a bearing surface adjacent the second element, each shell being divided into two portions, the first of which is situated towards the upstream edge and the second of which is situated towards the downstream edge, and the bearing surface being profiled in the region of the first portion such that a gap defined between itself and the second element reduces in magnitude towards the downstream edge of the shell, and in the region of the second portion such that the gap formed between the second portion and the second element remains substantially constant, said gap between the second portion and the second element being no greater than a minimum gap between the first portion and the second element.

7. A fluid bearing assembly according to claim 6, wherein each shell is provided with a profiled portion at its leading edge which comprises an extended portion having a radially extending edge and a circumferentially extending edge and the profiled portion at the trailing edge comprises a cut-out having a radially extending edge and a circumferentially extending edge.

8. A fluid bearing assembly according to claim 7, wherein the radially extending edges at the leading edge and trailing edge communicate with each other to prevent the shells moving radially inward beyond a predetermined point.

9. A fluid bearing assembly according to claim 7, wherein radially outward movement of the shells is accomodated by allowing each shell to slide over the next adjacent shell in the region of the circumferentially extending edges.

10. A fluid bearing assembly according to claim 6, wherein said gap between the second portion and the second element is the same as said minimum gap.

11. A fluid bearing assembly according to claim 6, wherein the second element is a shaft having a circular cross sectional form and the shells are circumferentially spaced around the shaft.

12. A fluid bearing assembly according to claim 6, wherein each shell is provided with a profiled portion at its leading edge and its trailing edge and wherein each leading edge portion communicates with the trailing edge portion of the next adjacent shell to prevent the shells moving radially inwards beyond a predetermined point whilst allowing said shells to move radially outwardly.

13. A fluid bearing assembly according to claim 12, wherein the radially outward movement of the shells is limited by the action of a resilient retaining means.

* * * * *